(12) United States Patent
Basiliere

(10) Patent No.: US 10,473,143 B2
(45) Date of Patent: Nov. 12, 2019

(54) CONTROL DEVICE

(71) Applicant: Wolf Tooth Components, LLC, Savage, MN (US)

(72) Inventor: Marc L. Basiliere, Albuquerque, NM (US)

(73) Assignee: Wolf Tooth Components, LLC, Savage, MN (US)

( * ) Notice: Subject to any disclaimer, the term of this patent is extended or adjusted under 35 U.S.C. 154(b) by 0 days.

(21) Appl. No.: 16/113,888

(22) Filed: Aug. 27, 2018

(65) Prior Publication Data

US 2019/0063489 A1 Feb. 28, 2019

Related U.S. Application Data

(60) Provisional application No. 62/550,693, filed on Aug. 27, 2017.

(51) Int. Cl.
| | |
|---|---|
| *F16C 1/12* | (2006.01) |
| *F16C 1/18* | (2006.01) |
| *G05G 1/04* | (2006.01) |
| *B62J 1/00* | (2006.01) |

(52) U.S. Cl.
CPC ........ *F16C 1/12* (2013.01); *B62J 1/00* (2013.01); *F16C 1/18* (2013.01); *G05G 1/04* (2013.01)

(58) Field of Classification Search
CPC ...... F16C 1/12; F16C 1/18; G05G 1/04; B62J 1/00
See application file for complete search history.

(56) References Cited

U.S. PATENT DOCUMENTS

| | | | |
|---|---|---|---|
| 4,325,267 A * | 4/1982 | Kojima | B62M 25/04 74/473.13 |
| 5,149,034 A | 9/1992 | Ganaja | |
| 5,493,933 A | 2/1996 | Kelly | |
| 5,588,331 A | 12/1996 | Huang et al. | |
| 5,701,786 A | 12/1997 | Kawakami | |
| 5,791,195 A | 8/1998 | Campagnolo | |
| 5,860,326 A | 1/1999 | Lussier | |
| 5,881,602 A | 3/1999 | Cirami | |
| 6,264,224 B1 | 7/2001 | Phillips | |
| 6,792,826 B2 | 9/2004 | Dal Pra' | |
| 6,862,948 B1 | 3/2005 | Calendrille, Jr. | |
| 7,841,258 B2 | 11/2010 | Cesur et al. | |
| 7,878,089 B2 | 2/2011 | McLaughlin et al. | |
| 8,061,667 B2 * | 11/2011 | Weiss | B62K 23/06 248/229.13 |

(Continued)

OTHER PUBLICATIONS

Cunningham, Pinkbike, OneUp Components' Travel-Adjustable Dropper Post—First Ride, Apr. 18, 2018, retrieved from the Internet at: <https://www.pinkbike.com/news/oneup-components-travel-adjustable-dropper-post-first-look.html>, 8 pages.

(Continued)

*Primary Examiner* — Vicky A Johnson
(74) *Attorney, Agent, or Firm* — Dicke, Billig & Czaja, PLLC

(57) ABSTRACT

A control device includes an actuation lever, a bearing mounted in the actuation lever, an axle extended through the bearing, and a base supported by the axle, the actuation lever pivotally coupled with the base via the bearing and the axle for rotation relative to the base.

38 Claims, 10 Drawing Sheets

(56) References Cited

U.S. PATENT DOCUMENTS

| | | |
|---|---|---|
| 8,490,995 B2 | 7/2013 | Hunt et al. |
| 8,833,200 B2 | 9/2014 | Hunt et al. |
| 9,073,596 B2 | 7/2015 | McLaughlin et al. |
| 9,126,650 B2 | 9/2015 | Dal Pra' et al. |
| 9,221,433 B2 | 12/2015 | Dunlap |
| 9,533,571 B1 | 1/2017 | Urmosi |
| 2006/0096404 A1* | 5/2006 | Wessel ............ B62K 23/06 74/501.6 |
| 2007/0137387 A1 | 6/2007 | Dal Pra |
| 2007/0261508 A1 | 11/2007 | Acenbrak |
| 2008/0202277 A1* | 8/2008 | Miki ............ B62K 23/06 74/502.2 |
| 2009/0158881 A1* | 6/2009 | Shahana ............ B62K 23/06 74/502 |
| 2010/0139442 A1* | 6/2010 | Tsumiyama ............ B60T 7/102 74/502.2 |
| 2011/0138961 A1 | 6/2011 | Dal Pra' |
| 2013/0220062 A1* | 8/2013 | Valle ............ B62M 25/04 74/523 |
| 2014/0083826 A1 | 3/2014 | Greenberg et al. |
| 2014/0137696 A1* | 5/2014 | Kosaka ............ B62M 25/08 74/523 |
| 2016/0272270 A1* | 9/2016 | Miki ............ B62K 23/06 |

OTHER PUBLICATIONS

OneUp Components, Dropper Post Remote, Oct. 24, 2018, retrieved from the Internet at: <https://www.oneupcomponents.com/products/dropper-post-lever>, 3 pages.

* cited by examiner

CONTROL DEVICE

CROSS-REFERENCE TO RELATED APPLICATIONS

This application claims priority under 35 U.S.C. § 119(e) to U.S. Provisional Patent Application Ser. No. 62/550,693 filed on Aug. 27, 2017, and incorporated herein by reference.

BACKGROUND

The present disclosure relates generally to a control device and, more specifically, relates to a control device for actuating a height adjustment device for a saddle of a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
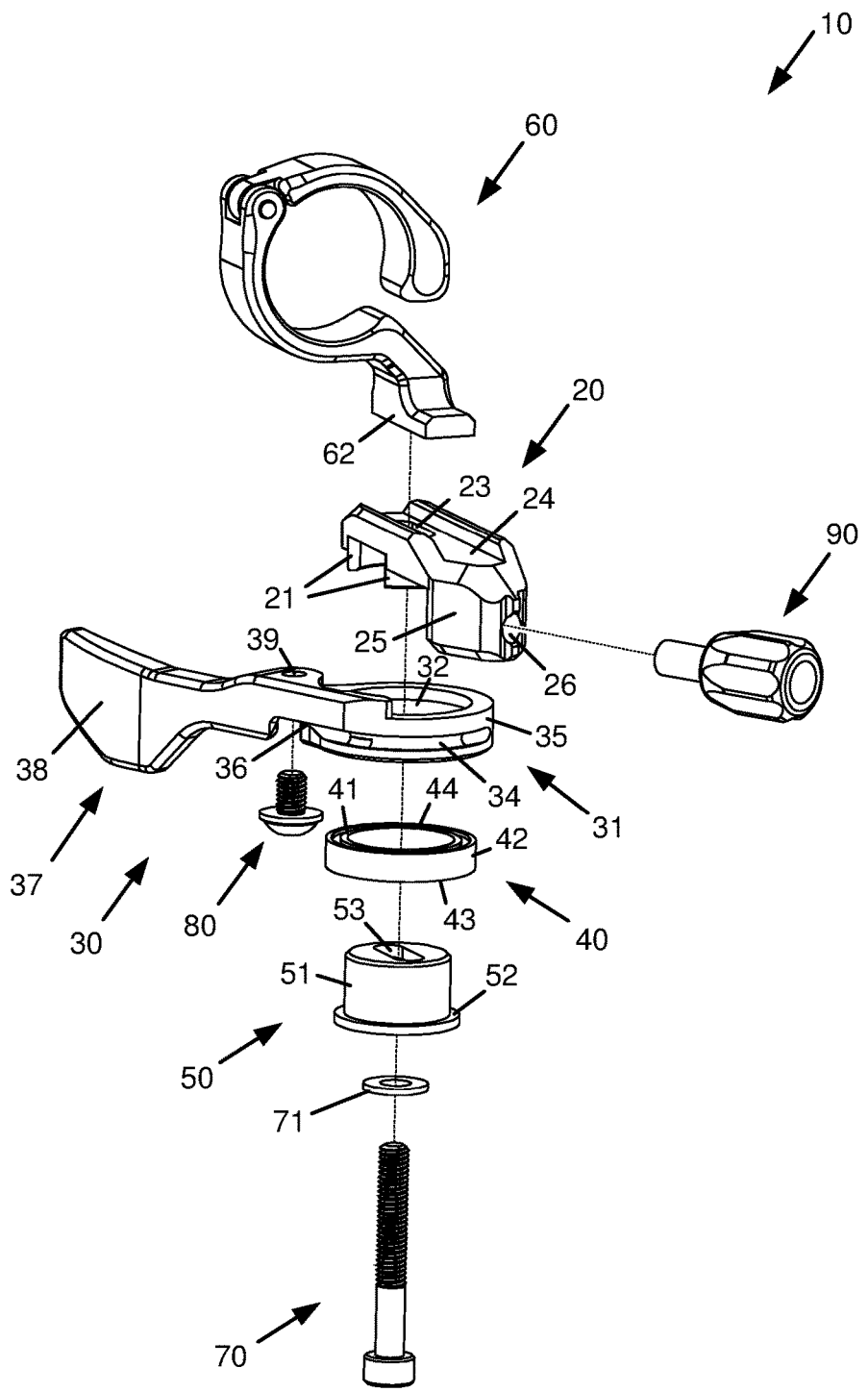
FIG. 1 is an exploded top perspective view of an example of a control device in accordance with the present disclosure.
Figure 2:
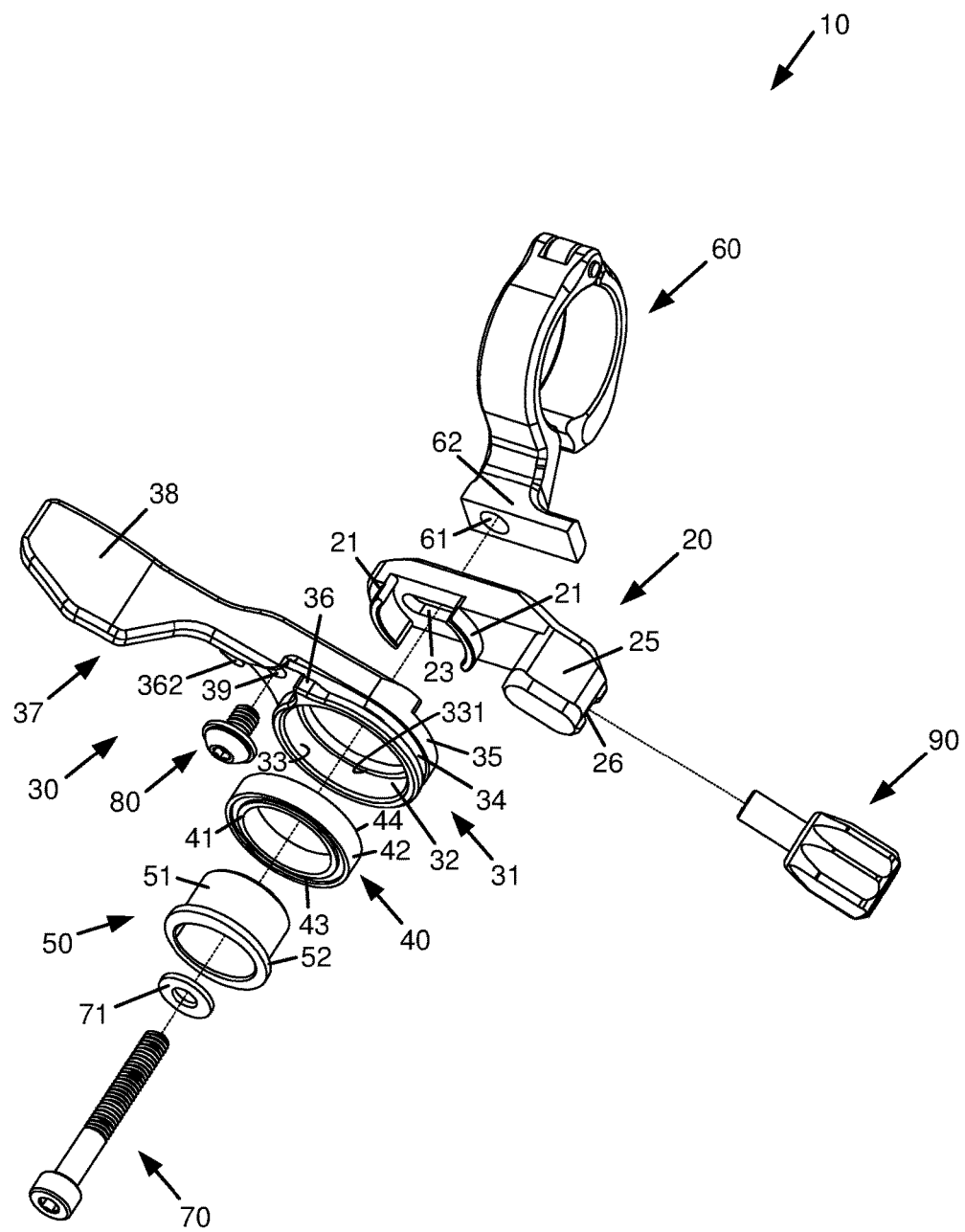
FIG. 2 is an exploded bottom perspective view of the control device of FIG. 1.

FIG. 1 is an exploded top perspective view of an example of a control device 10 in accordance with the present disclosure, and FIG. 2 is an exploded bottom perspective view of control device 10. In one example, control device 10 includes a base 20, an actuation lever 30, a bearing 40, and an axle 50. As described herein, bearing 40 is mounted in actuation lever 30, axle 50 is extended through bearing 40, and base 20 is supported by axle 50. In one implementation, bearing 40 is a rolling-element bearing such as a ball bearing.

In the illustrated example, base 20 includes shoulders 21, actuation lever 30 includes a body portion 31 having a hole 32 therethrough and a lever portion 37 extended from body portion 31, bearing 40 includes an inner race 41 and an outer race 42, and axle 50 has an outer diameter surface 51 and includes a flange 52 at one end. In one implementation, body portion 31 of actuation lever 30 is of a ring or annular shape, and bearing 40 is mounted (e.g., press fit) within hole 32 of body portion 31 such that outer race 42 of bearing 40 contacts an inner diameter surface 33 of body portion 31 (with inner diameter surface 33, in one implementation, including a lip 331 as a seat for bearing 40). In addition, axle 50 is extended through bearing 40 such that flange 52 contacts a face 43 of bearing 40 and outer diameter surface 51 of axle 50 contacts inner race 41 of bearing 40. Furthermore, base 20 is supported by axle 50 such that shoulders 21 fit over outer diameter surface 51 of axle 50 and, in one implementation, extend into hole 32 of body portion 31 and contact a face 44 of bearing 40. As such, actuation lever 30 is pivotally coupled with base 20, via bearing 40 and axle 50, for rotation relative to base 20.

In one example, control device 10 includes a fitment or mount 60. As described herein, base 20 and actuation lever 30, with bearing 40 and axle 50, are secured to mount 60. In the illustrated example, axle 50 and base 20 have respective holes 53 and 23 therethrough and mount 60 includes a threaded hole 61 such that an assembly bolt 70 (with washer 71) extended through holes 53 and 23 is threaded into threaded hole 61 to secure base 20 and actuation lever 30, with bearing 40 and axle 50, to mount 60. In one implementation, base 21 has an adjustment channel 24 formed therein to receive a foot 62 of mount 60, and holes 53 and 23 of axle 50 and base 20 each have an elongated shape such that base 20 and actuation lever 30, with bearing 40 and axle 50, may be laterally adjusted relative to mount 60, as described herein.

In the illustrated example, body portion 31 of actuation lever 30 has a cable channel or groove 34 formed in an outer diameter surface 35 thereof and has a cable guide feature 36 formed thereon, and base 20 includes a projection or tab 25 having a cable passage 26 formed therethrough such that an actuation or control cable may be fed through cable passage 26 and routed along cable channel or groove 34 and cable guide feature 36. As such, in one implementation, a cable pinch bolt or fixing bolt 80 is threaded into a threaded hole 39 of actuation lever 30 and tightened to capture and secure an end portion of an actuation or control cable fed through cable passage 26 and routed along cable channel or groove 34 and cable guide feature 36. In the illustrated example, lever portion 37 of actuation lever 30 has a cable guide feature 362 formed thereon such that an actuation or control cable may be routed along cable guide feature 362. In one example, a barrel adjuster 90 is threaded into cable passage 26 such that tension on an actuation or control cable passing through cable passage 26 (and secured by cable pinch bolt or fixing bolt 80) may be adjusted.

Figure 3:
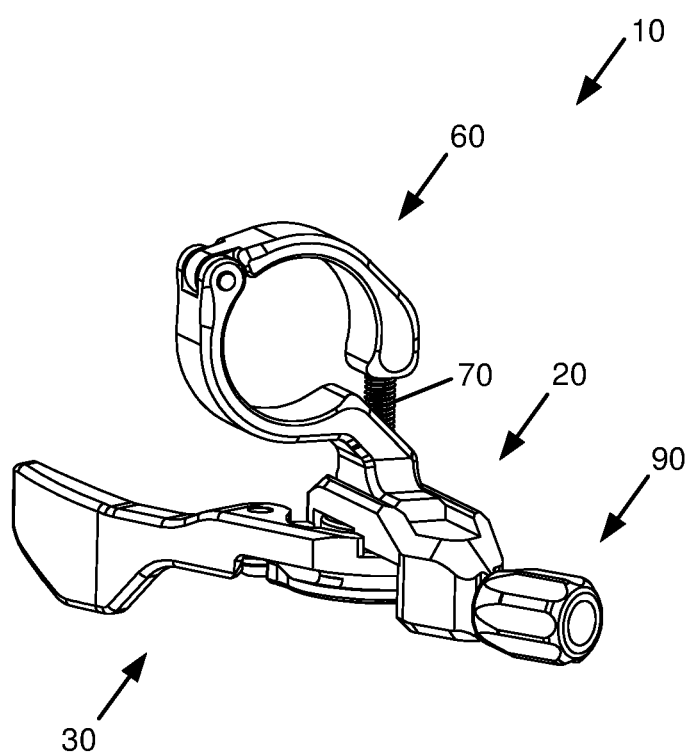
FIG. 3 is an assembled top perspective view of the control device of FIG. 1.
Figure 4:
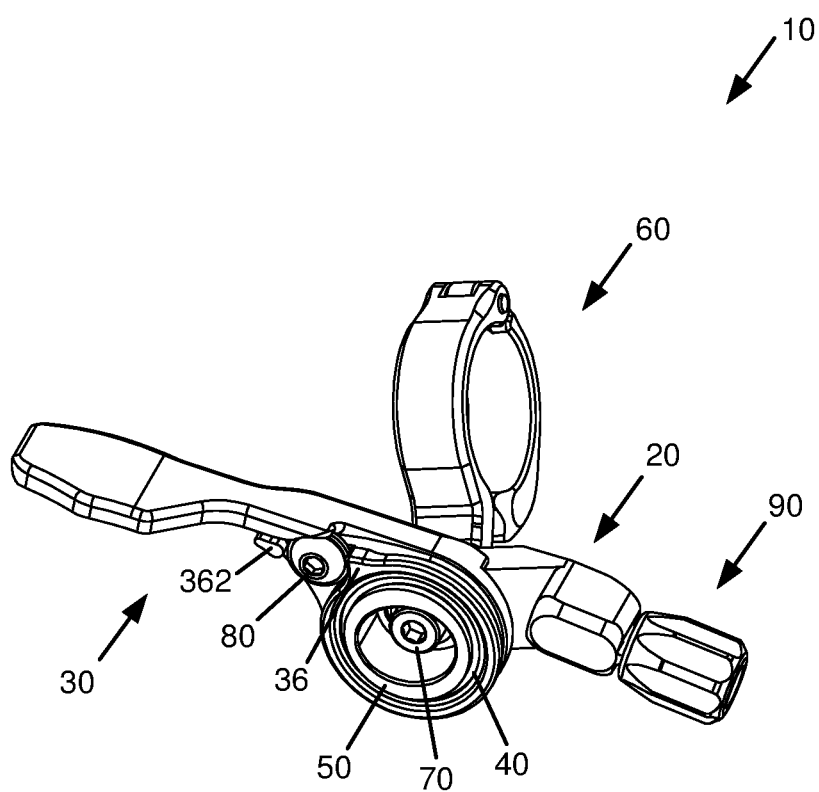
FIG. 4 is an assembled bottom perspective view of the control device of FIG. 1.

FIG. 3 is an assembled top perspective view of control device 10, and FIG. 4 is an assembled bottom perspective view of control device 10. In one implementation, assembly bolt 70 (with washer 71) is extended through respective holes 53 and 23 of axle 50 and base 20 and threaded into threaded hole 61 of mount 60 to secure base 20 and actuation lever 30, with bearing 40 and axle 50, to mount 60.

Figure 5:
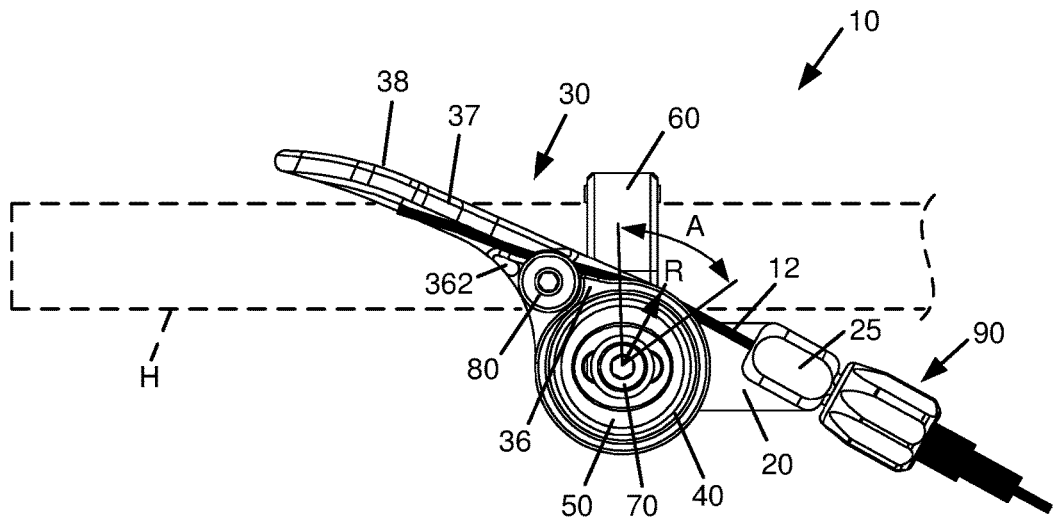
FIG. 5 is a bottom view of an example of the assembled control device of FIGS. 3 and 4 in an unactuated state.
Figure 6:
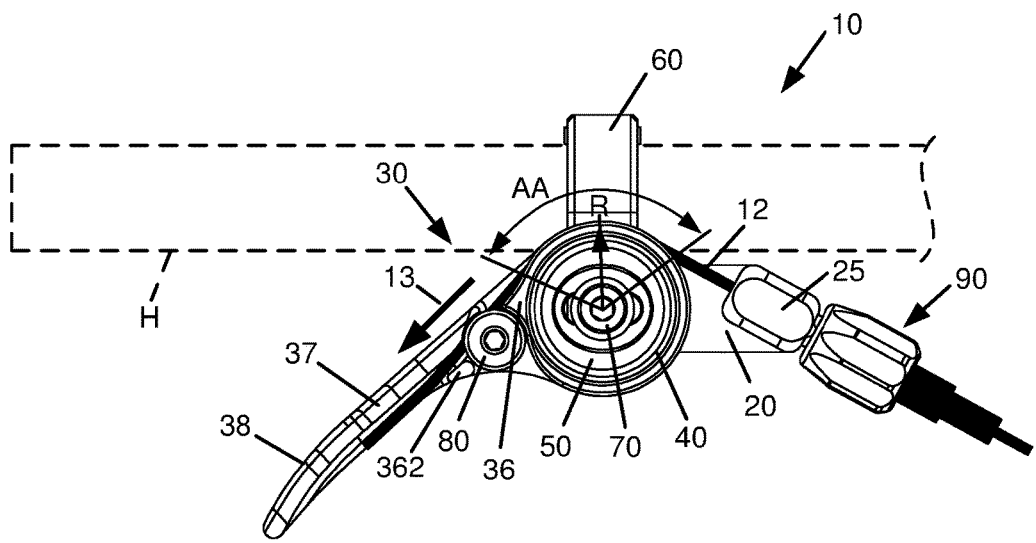
FIG. 6 is a bottom view of an example of the assembled control device of FIGS. 3 and 4 in an actuated state.

FIG. 5 is a bottom view of an example of control device 10 in an unactuated state, and FIG. 6 is a bottom view of an example of the control device 10 in an actuated state. As illustrated in the examples of FIGS. 5 and 6, an actuation or control cable 12 is fed through barrel adjuster 90 and tab 25 of base 20, including, more specifically, cable passage 26 of tab 25, and routed along cable channel or groove 34 (FIGS. 1, 2) and cable guide feature 36 and cable guide feature 362, such that an end portion of actuation or control cable 12 is captured and secured to actuation lever 30, for example, by cable pinch bolt or fixing bolt 80.

As illustrated in the example of FIG. 5, actuation lever 30 and, therefore, control device 10, is in an unactuated (or neutral) state such that pull is not applied to actuation or control cable 12. As illustrated in the example of FIG. 6, actuation lever 30 and, therefore, control device 10, is in an actuated state such that pull is applied to actuation or control cable 12, as represented by arrow 13. More specifically, in the example of FIG. 6, actuation lever 30 is pivoted or rotated relative to base 20 (and mount 60) about axle 50. Actuation lever 30 is rotated, for example, by contact with a contact surface 38 of lever portion 37 (see also FIG. 1). Contact with contact surface 38 of lever portion 37 may be established or provided, for example, by a thumb (e.g., left thumb) of a user.

As illustrated in the example of FIG. 5, in the unactuated (or neutral) state, control device 10 has a contact or wrap angle A (as a measurement of a length of actuation or control cable 12 routed within cable channel or groove 34). In one implementation, in the unactuated (or neutral) state, wrap angle A is in a range of approximately 5 degrees to approximately 20 degrees. In one implementation, wrap angle A represents a minimum contact or wrap angle of control device 10 and is approximately 12 degrees.

As illustrated in the example of FIG. 6, in the actuated state, control device 10 has a contact or wrap angle AA (as a measurement of a length of actuation or control cable 12 routed within cable channel or groove 34). In one implementation, in the actuated state, wrap angle AA is in a range of approximately 70 degrees to approximately 85 degrees. In one implementation, wrap angle AA represents a maximum contact or wrap angle AA of control device 10 and is approximately 77 degrees. As such, in one implementation, with a minimum contact or wrap angle A of approximately 12 degrees and a maximum contact or wrap angle AA of approximately 77 degrees, a total lever actuation range of control device 10 is approximately 65 degrees.

In one implementation, as illustrated in the examples of FIGS. 5 and 6, actuation lever 30 has a contact or wrap radius R (as measured from a center of axle 50 to cable channel or groove 34) in a range of approximately 8 mm to approximately 15 mm. In one implementation, wrap radius R represents a minimum contact or wrap radius of control device 10 and is approximately 12 mm. In addition, in one implementation, bearing 40 has an outer diameter in a range of approximately 10 mm to approximately 30 mm. In one implementation, bearing 40 has an outer diameter of approximately 21 mm.

Figure 7:
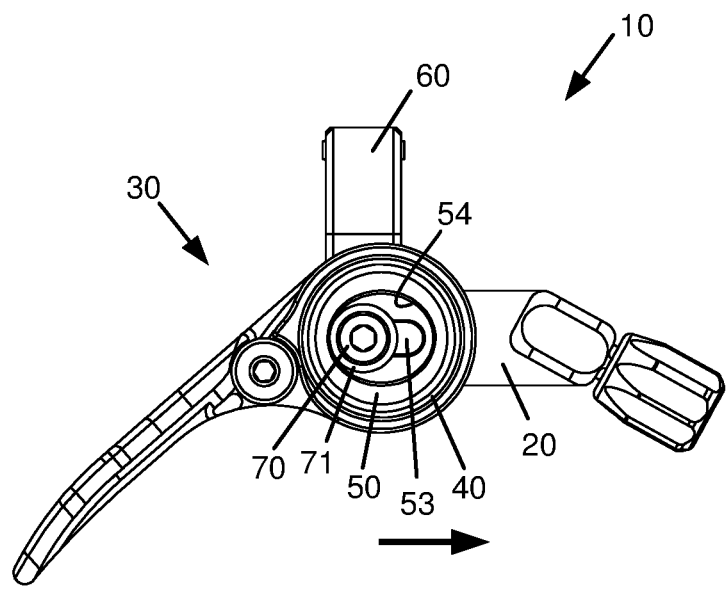
FIG. 7 is a bottom view of an example of the assembled control device of FIGS. 3 and 4 in one lateral position.
Figure 8:
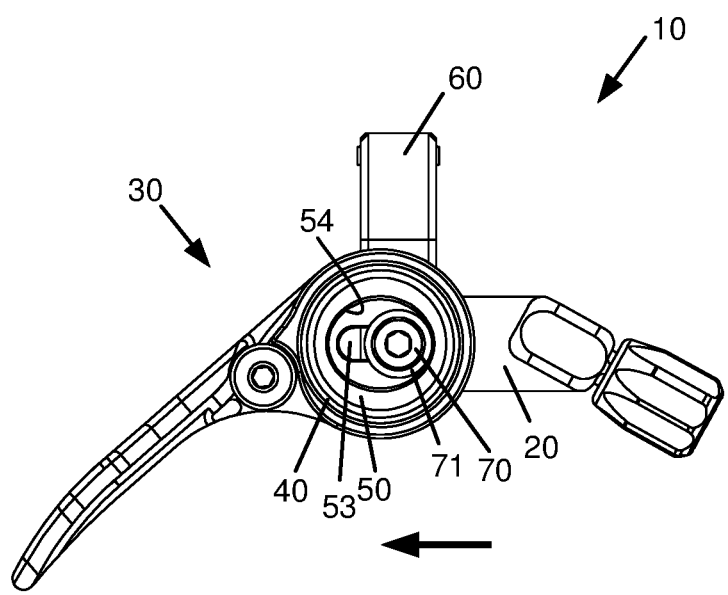
FIG. 8 is a bottom view of an example of the assembled control device of FIGS. 3 and 4 in another lateral position.

FIG. 7 is a bottom view of an example of control device 10 in one lateral position, and FIG. 8 is a bottom view of an example of control device 10 in another lateral position. As illustrated in the examples of FIGS. 7 and 8, actuation lever 30, with bearing 40 and axle 50, is laterally adjustable relative to mount 60. More specifically, with respective holes 53 and 23 of axle 50 and base 20 each having an elongated shape, base 20 and actuation lever 30, with bearing 40 and axle 50, may be laterally adjusted relative to mount 60.

In one example, with assembly bolt 70 (and washer 71) loosened, base 20 and actuation lever 30, with bearing 40 and axle 50, may be moved laterally relative to mount 60 (e.g., slid or moved to the right as illustrated in the example of FIG. 7 and slid or moved to the left as illustrated in the example of FIG. 8). As such, assembly bolt 70 is tightened to secure base 20 and actuation lever 30, with bearing 40 and axle 50, in the laterally adjusted position. In one example, as base 20 and actuation lever 30, with bearing 40 and axle 50, are moved laterally, base 20 slides along foot 62 of mount 60, as positioned within adjustment channel 24 of base 20 (FIG. 1, 3).

In one implementation, axle 50 has an oval or elliptical inner profile 54 with a long axis oriented parallel with the elongated shape of hole 53 of axle 50. As such, increased lateral adjustment of actuation lever 30, with a bearing 40 and axle 50, may be achieved.

Figure 9:
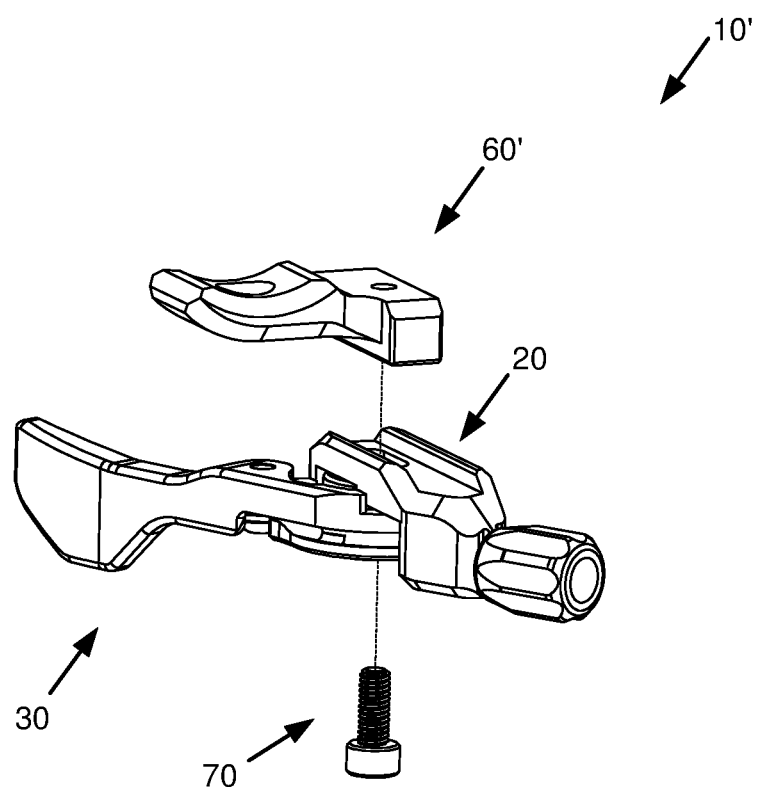
FIG. 9 is a top perspective view of another example of a control device in accordance with the present disclosure, illustrating another example of a mount for the control device.
Figure 10:
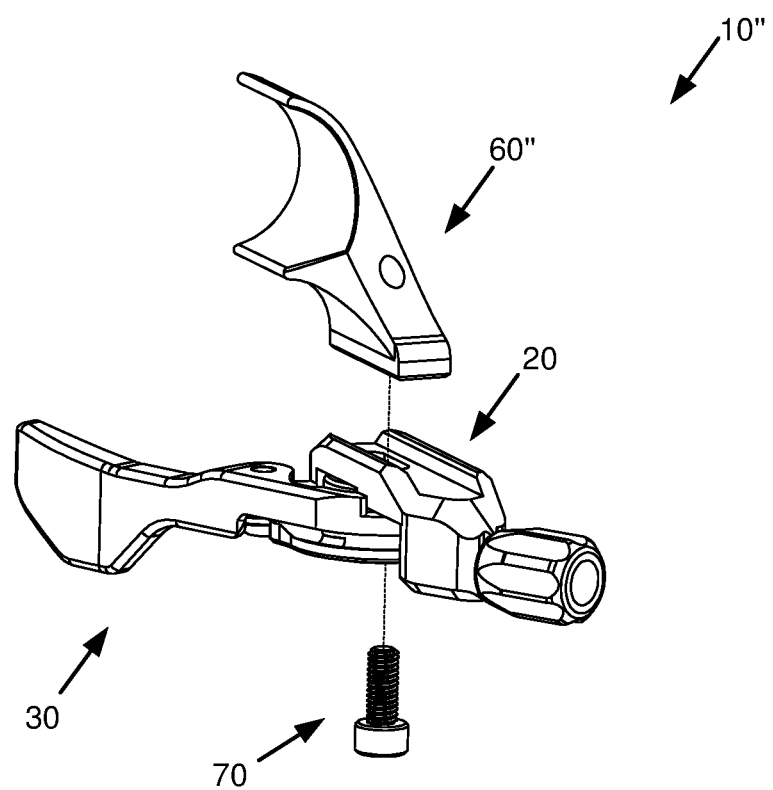
FIG. 10 is a top perspective view of another example of a control device in accordance with the present disclosure, illustrating another example of a mount for the control device.
Figure 11:
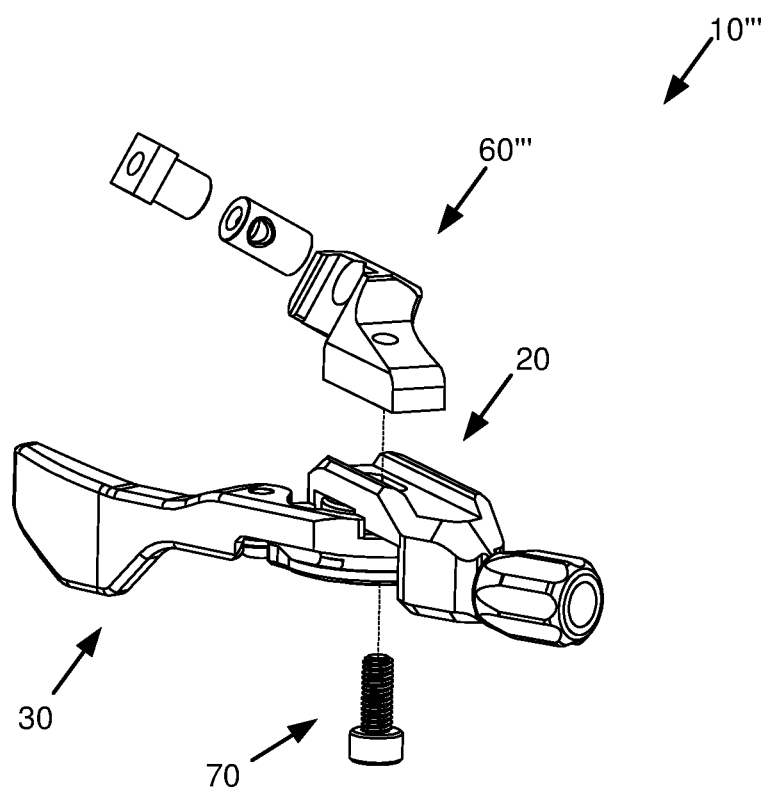
FIG. 11 is a top perspective view of another example of a control device in accordance with the present disclosure, illustrating another example of a mount for the control device.

In one implementation, as illustrated in FIGS. 1-8, mount 60 of control device 10 is a bar clamp mount for mounting control device 10 to a handlebar of a bicycle. More specifically, mount 60 clamps around a portion of a handlebar H of a bicycle for mounting control device 10 directly to the handlebar (as represented by broken lines in the example of FIGS. 5 and 6). In other implementations, other fitments, mounts or mounting systems may be provided, including, for example, a SRAM MatchMaker X mount, a Shimano I-Spec II mount, or a Shimano I-Spec AB mount, to support other mounting arrangements or configurations of control device 10. For example, as illustrated in the example of FIG. 9, control device 10' includes a mount 60' for use with a SRAM MatchMaker X clamp (with the other components of control device 10' being similar to that of control device 10 of FIGS. 1-8). In addition, as illustrated in the example of FIG. 10, control device 10" includes a mount 60" for use with a Shimano I-Spec II clamp (with the other components of control device 10" being similar to that of control device 10 of FIGS. 1-8). In addition, as illustrated in the example of FIG. 11, control device 10''' includes a mount 60''' for use with a Shimano I-Spec AB clamp (with the other components of control device 10''' being similar to that of control device 10 of FIGS. 1-8).

Figure 12:
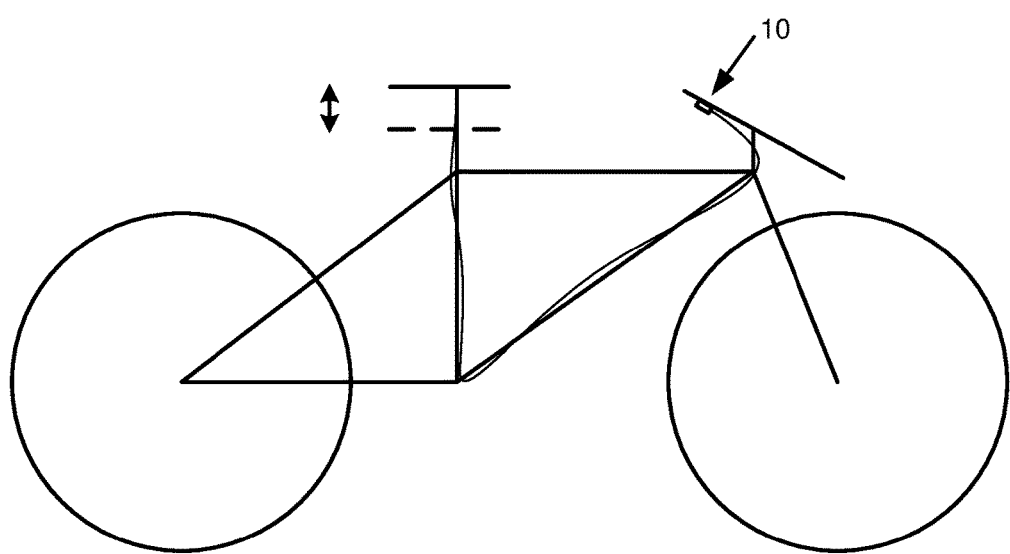
FIG. 12 is a schematic view illustrating an example implementation of a control device in accordance with the present disclosure.

In one implementation, as schematically illustrated in the example of FIG. 12, control device 10 (including control device 10', 10", and 10''') is used to control or actuate a height adjustment device for a saddle of a bicycle. More specifically, control device 10 (including control device 10', 10", and 10''') may be mounted on a bicycle (e.g., a handlebar of a bicycle), such that operation or actuation of control device 10 may be used to apply pull to an actuation or control cable coupled with a height adjustment device for a saddle of a bicycle. Although the disclosed control device is illustrated and described as being used to control or actuate a height adjustment device for a saddle of a bicycle, the disclosed control device may be used to control or actuate other cable-actuated or cable-controlled elements, components, systems, structures, or devices.

Although illustrated as a left-actuated control device, control device 10 may be implemented as a right-actuated control device wherein components of control device 10 are mirrored about a rotational axis of control device 10.

A control device as disclosed herein provides for improved operation and actuation or control of a cable-actuated or cable-controlled element, component, system, structure, or device. For example, by supporting an actuation lever on a bearing as disclosed herein, smoother operation and actuation is provided.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A control device, comprising:
an actuation lever;
a bearing mounted in the actuation lever, the bearing having an inner race and an outer race;
an axle extended through the bearing such that an outer diameter surface of the axle contacts the inner race of the bearing; and
a base supported by the axle,
the actuation lever pivotally coupled with the base via the bearing and the axle for rotation relative to the base.

2. The control device of claim 1, the actuation lever including a body portion and a lever portion extended from the body portion, the bearing mounted within the body portion.

3. The control device of claim 1, the base including a shoulder, the shoulder fit over the axle.

4. The control device of claim 1, further comprising:
a bolt to secure the base and the actuation lever.

5. The control device of claim 4, the bolt extended through a hole in the axle.

6. The control device of claim 4, the bolt extended through a hole in the base.

7. The control device of claim 1, further comprising:
a cable fixing bolt to secure a control cable to the actuation lever.

8. The control device of claim 7, the base having a cable passage through which the control cable is to be fed.

9. The control device of claim 1, further comprising:
a mount to which the base and the actuation lever, with the bearing and the axle, are secured.

10. The control device of claim 9, the base and the actuation lever, with the bearing and the axle, laterally adjustable relative to the mount.

11. The control device of claim 1, the axle and the base each having a hole therethrough, the hole in each of the axle and the base having an elongated shape.

12. The control device of claim 11, the axle having an elliptical inner profile with a long axis oriented parallel with the elongated shape of the hole through the axle.

13. A control device, comprising:
an actuation lever;
a bearing mounted in the actuation lever;
an axle extended through the bearing;
a base supported by the axle; and
a mount to which the base and the actuation lever, with the bearing and the axle, are secured,
the actuation lever pivotally coupled with the base via the bearing and the axle for rotation relative to the base,
the base and the actuation lever, with the bearing and the axle, laterally adjustable relative to the mount.

14. The control device of claim 13, the actuation lever including a body portion and a lever portion extended from the body portion, the bearing mounted within the body portion.

15. The control device of claim 13, the base including a shoulder, the shoulder fit over the axle.

16. The control device of claim 13, further comprising:
a bolt to secure the base and the actuation lever.

17. The control device of claim 13, further comprising:
a cable fixing bolt to secure a control cable to the actuation lever.

18. A control device, comprising:
an actuation lever;
a bearing mounted in the actuation lever;
an axle extended through the bearing; and
a base supported by the axle,
the actuation lever pivotally coupled with the base via the bearing and the axle for rotation relative to the base,
the axle and the base each having a hole therethrough, the hole in each of the axle and the base having an elongated shape,
the axle having an elliptical inner profile with a long axis oriented parallel with the elongated shape of the hole through the axle.

19. The control device of claim 18, the actuation lever including a body portion and a lever portion extended from the body portion, the bearing mounted within the body portion.

20. The control device of claim 18, the base including a shoulder, the shoulder fit over the axle.

21. The control device of claim 18, further comprising:
a bolt to secure the base and the actuation lever.

22. The control device of claim 18, further comprising:
a cable fixing bolt to secure a control cable to the actuation lever.

23. A control device, comprising:
a base;
an actuation lever including a body portion and a lever portion extended from the body portion; and
a bearing having an inner race and an outer race, the bearing mounted in the body portion of the actuation lever such that the outer race of the bearing contacts an inner diameter surface of the body portion,
the actuation lever pivotally coupled with the base via the bearing for rotation relative to the base.

24. The control device of claim 23, the body portion of the actuation lever having a hole therethrough, the bearing mounted within the hole of the body portion.

25. The control device of claim 24, the base including a shoulder, the shoulder extended into the hole of the body portion of the actuation lever such that the shoulder contacts a face of the bearing.

26. The control device of claim 23, the body portion of the actuation lever having a groove formed in an outer diameter surface thereof along which a control cable is to be routed.

27. The control device of claim 23, the body portion of the actuation lever having a cable guide feature formed thereon along which a control cable is to be routed.

28. The control device of claim 23, further comprising:
a bolt to secure the base and the actuation lever.

29. The control device of claim 23, the base having a cable passage through which a control cable is to be fed, and further comprising a cable fixing bolt to secure the control cable to the actuation lever.

30. The control device of claim 23, the lever portion of the actuation lever having a cable guide feature formed thereon along which a control cable is to be routed.

31. The control device of claim 23, the lever portion of the actuation lever having a contact surface to be contacted by a user of the control device.

32. A control device, comprising:
a base;
an actuation lever; and
a bearing mounted in the actuation lever,
the actuation lever pivotally coupled with the base via the bearing for rotation relative to the base,
the actuation lever including a body portion and a lever portion extended from the body portion,
the lever portion of the actuation lever having a cable guide feature formed thereon along which a control cable is to be routed.

33. The control device of claim 32, the body portion of the actuation lever having a hole therethrough, the bearing mounted within the hole of the body portion.

34. The control device of claim 33, the base including a shoulder, the shoulder extended into the hole of the body portion of the actuation lever.

35. The control device of claim 32, the body portion of the actuation lever having a groove formed in an outer diameter surface thereof along which a control cable is to be routed.

36. The control device of claim 32, the body portion of the actuation lever having a cable guide feature formed thereon along which a control cable is to be routed.

37. The control device of claim 32, further comprising:
a bolt to secure the base and the actuation lever.

38. The control device of claim 32, the base having a cable passage through which a control cable is to be fed, and further comprising a cable fixing bolt to secure the control cable to the actuation lever.

\* \* \* \* \*